United States Patent
Mathews et al.

(10) Patent No.: US 10,590,790 B2
(45) Date of Patent: Mar. 17, 2020

(54) HULA SEAL

(71) Applicant: ANSALDO ENERGIA SWITZERLAND AG, Baden (CH)

(72) Inventors: Hans-Christian Mathews, Zürich (CH); Urs Benz, Gipf-Oberfrick (CH); Frank Graf, Nussbaumen (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 968 days.

(21) Appl. No.: 15/081,196

(22) Filed: Mar. 25, 2016

(65) Prior Publication Data
US 2016/0281523 A1   Sep. 29, 2016

(30) Foreign Application Priority Data
Mar. 27, 2015   (EP) .................... 15161400

(51) Int. Cl.
*F01D 11/00*   (2006.01)
*F01D 25/12*   (2006.01)
(Continued)

(52) U.S. Cl.
CPC .............. *F01D 11/005* (2013.01); *F01D 9/02* (2013.01); *F01D 9/023* (2013.01); *F01D 9/042* (2013.01); *F01D 11/003* (2013.01); *F01D 25/12* (2013.01); *F02C 7/28* (2013.01); *F16J 15/061* (2013.01); *F16J 15/062* (2013.01); *F23R 3/002* (2013.01); *F23R 3/60* (2013.01); *F05D 2220/32* (2013.01); *F05D 2240/12* (2013.01); *F05D 2240/55* (2013.01); *F05D 2250/14* (2013.01); *F05D 2260/20* (2013.01); *F23R 2900/00012* (2013.01)

(58) Field of Classification Search
None
See application file for complete search history.

(56) References Cited

U.S. PATENT DOCUMENTS 3,754,766 A   8/1973   Asplund
4,300,868 A   11/1981   Wilkinson et al.
(Continued)

FOREIGN PATENT DOCUMENTS

CN   102465720 A   5/2012
CN   102817641 A   12/2012
(Continued)

OTHER PUBLICATIONS

Search Report dated Sep. 29, 2015, by the European Patent Office for Application No. 15161400.
(Continued)

*Primary Examiner* — Kayla McCaffrey
(74) *Attorney, Agent, or Firm* — Buchanan Ingersoll & Rooney PC

(57) ABSTRACT

The invention concerns a conical hula seal wherein an inner part of the conical hula seal is closer to a conical hula seal longitudinal axis than an outer part of the conical hula seal, and wherein the conical hula seal extends in a circumferential direction relative to the conical hula seal longitudinal axis. A gas turbine which includes the conical hula seal is also disclosed, along with a method of operating a gas turbine which includes a conical hula seal that seals a gap between a first vane and a picture frame, the method including purging the gap with a cooling fluid.

18 Claims, 5 Drawing Sheets

(51) Int. Cl.
  *F23R 3/60* (2006.01)
  *F01D 9/02* (2006.01)
  *F02C 7/28* (2006.01)
  *F01D 9/04* (2006.01)
  *F23R 3/00* (2006.01)
  *F16J 15/06* (2006.01)

(56) References Cited

U.S. PATENT DOCUMENTS

| | | | |
|---|---|---|---|
| 5,333,995 A | 8/1994 | Jacobs et al. | |
| 6,547,257 B2 * | 4/2003 | Cromer | F01D 9/023 277/355 |
| 7,784,264 B2 * | 8/2010 | Weaver | F01D 9/023 60/39.37 |
| 9,115,585 B2 | 8/2015 | Melton et al. | |
| 2004/0251639 A1 | 12/2004 | Parker | |
| 2010/0300116 A1 | 12/2010 | Kaleeswaran et al. | |
| 2011/0120135 A1 | 5/2011 | Johnson et al. | |
| 2012/0119447 A1 | 5/2012 | Demiroglu et al. | |
| 2012/0304657 A1 | 12/2012 | Melton et al. | |
| 2012/0306166 A1 | 12/2012 | Melton et al. | |
| 2013/0084166 A1 | 4/2013 | Klingels | |
| 2013/0256993 A1 | 10/2013 | Burd et al. | |
| 2015/0184528 A1 * | 7/2015 | Belsom | F01D 9/023 60/800 |

FOREIGN PATENT DOCUMENTS

| | | |
|---|---|---|
| CN | 103398398 A | 11/2013 |
| DE | 20206822 U1 | 9/2002 |
| EP | 2 532 837 A2 | 12/2012 |
| EP | 2 532 969 A2 | 12/2012 |
| EP | 2 574 731 A2 | 4/2013 |
| GB | 2 037 901 A | 7/1980 |

OTHER PUBLICATIONS

Search Report dated Sep. 16, 2015, by the European Patent Office for Application No. 15161401.
Office Action dated Dec. 27, 2018, by the Chinese Patent Office in corresponding Chinese Patent Application No. 201610370673.5. (7 pages).
Second Office Action dated Aug. 14, 2019 in corresponding Chinese Patent Application No. 201610370673.5 with English Translation, 16 pages.

* cited by examiner

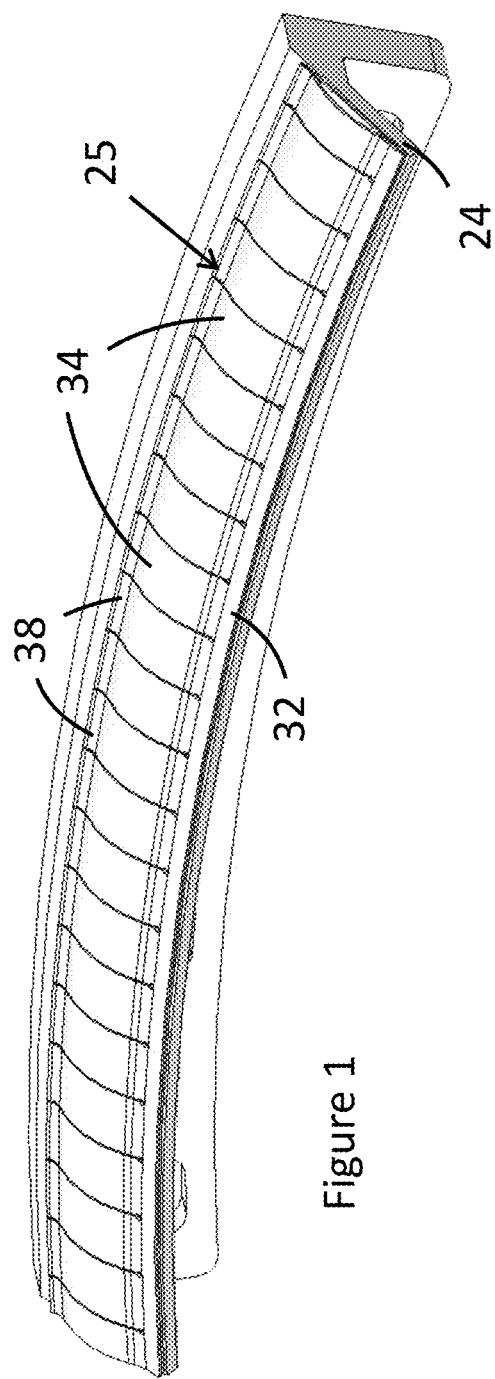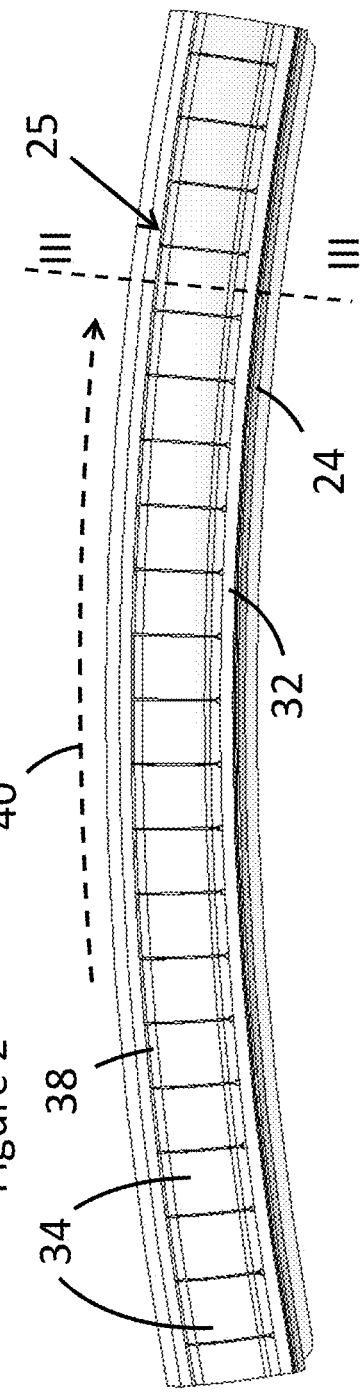
Figure 1
Figure 2

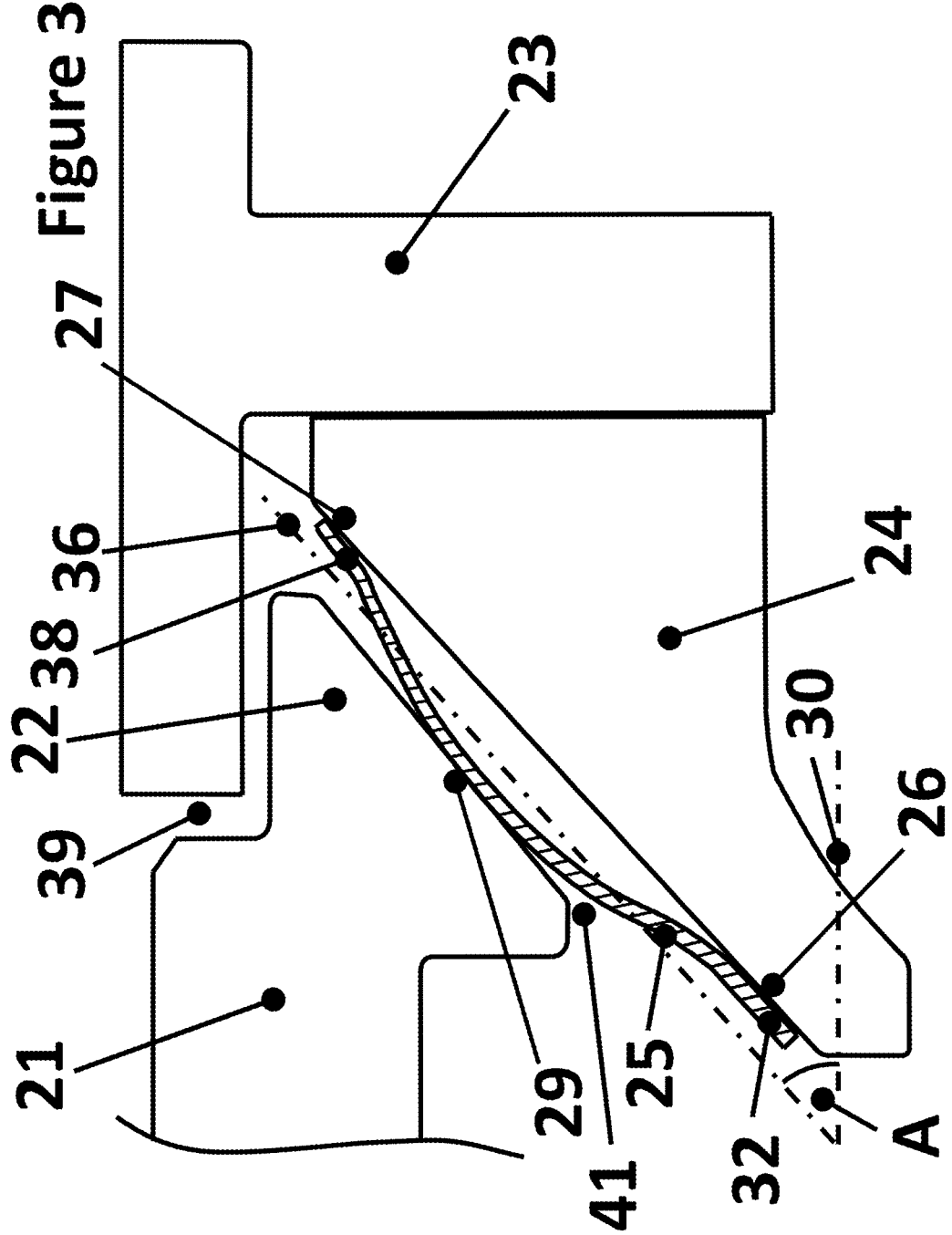

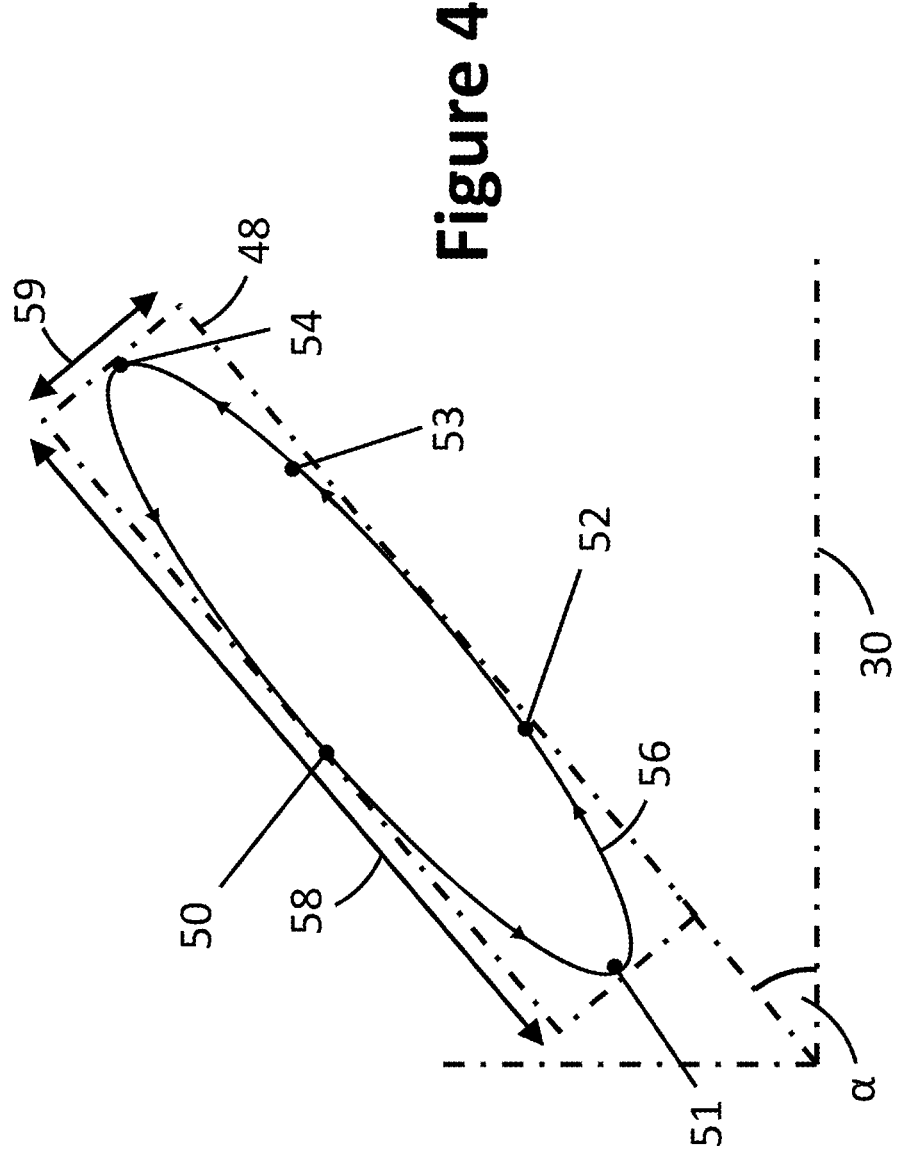

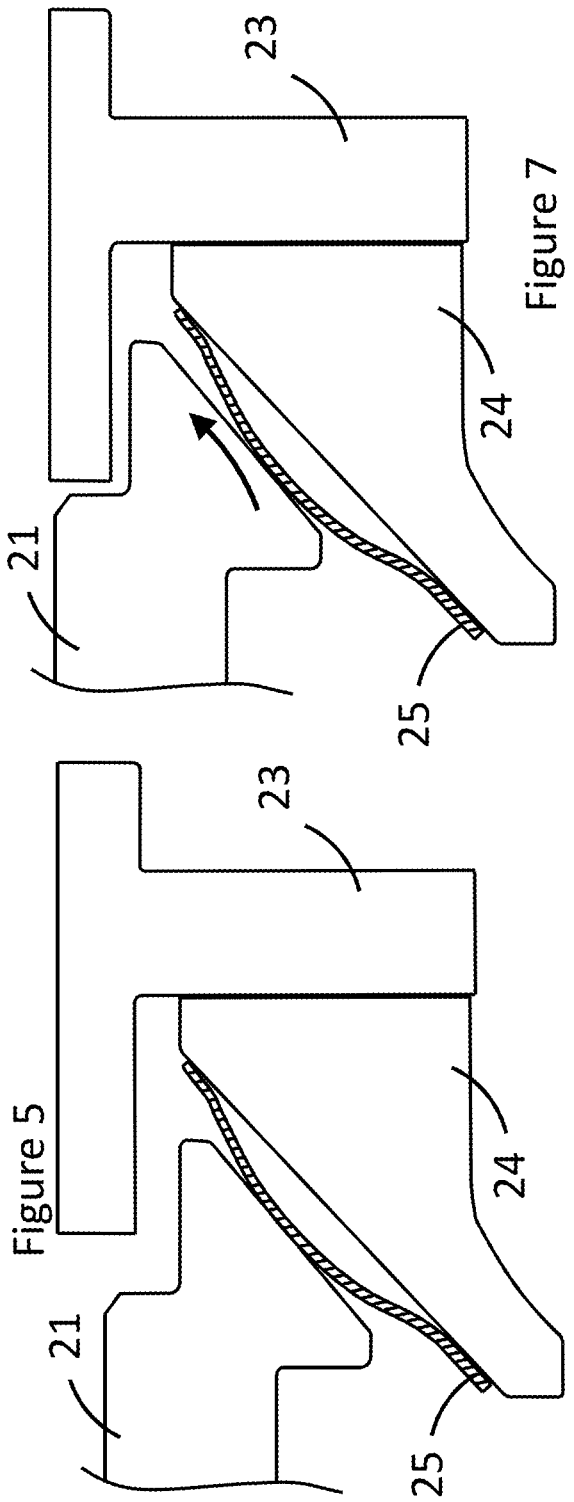
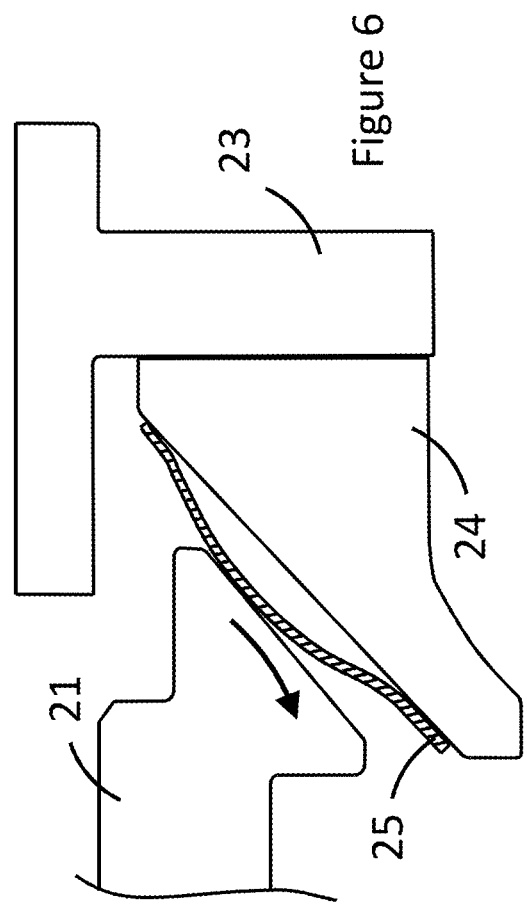

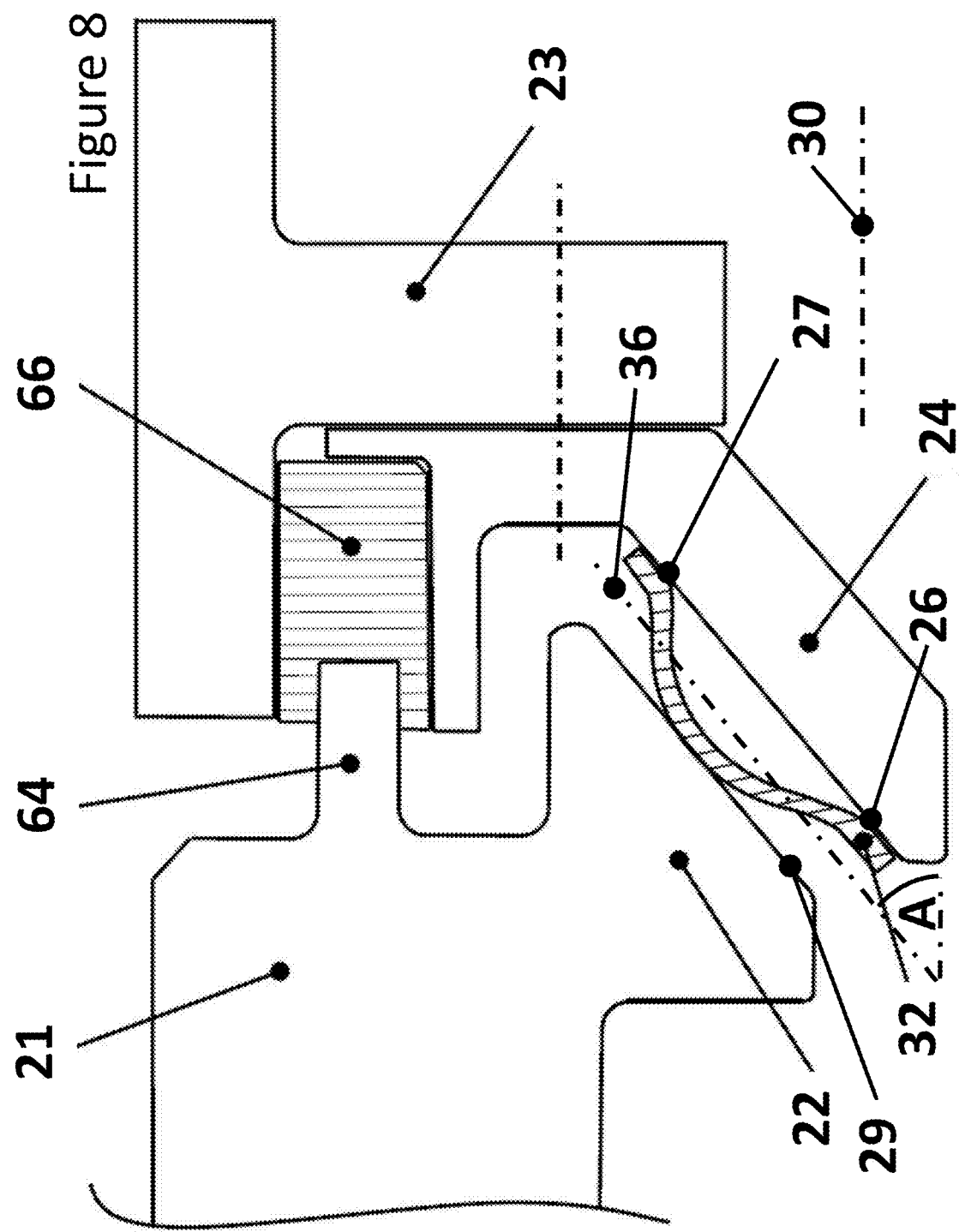

HULA SEAL

TECHNICAL FIELD

The present disclosure relates to hula seals, and particularly to a conical hula seal.

BACKGROUND OF THE INVENTION

In a gas turbine, there is a gap between the picture frames in the combustor outlet and the first vane of the turbine. Movement of the two parts relative to one another can be considerable, and a gap must be left between the parts to avoid contact. The gap is generally purged with cooling air. It has been appreciated that it would be advantageous to improve the design around this gap to, for example, reduce the cooling air requirements.

Annular hula seals are known from, for example, US 2012/0304657 and US 2010/0300116.

SUMMARY OF THE INVENTION

The invention is defined in the appended independent claims to which reference should now be made. Advantageous features of the invention are set forth in the dependent claims.

According to a first aspect of the invention, a conical hula seal is provided, wherein an inner part of the conical hula seal is closer to a conical hula seal longitudinal axis than an outer part of the conical hula seal, and wherein the conical hula seal extends in a circumferential direction relative to the conical hula seal longitudinal axis. This can provide a reliable and effective seal. The conical hula seal can compensate for and provide a seal despite movements in both the radial and axial directions relative to a gas turbine longitudinal axis, for example. The conical hula seal can be designed to seal over high sliding ranges and elastic displacements (spring effect). Therefore the conical hula seal can minimise leakage.

In one embodiment, the conical hula seal comprises a plurality of fingers, wherein the inner part is attached to one end of each of the plurality of fingers and the outer part is attached to the other end of each of the plurality of fingers. In one embodiment, the inner part and the outer part each extend in a circumferential direction relative to a conical hula seal longitudinal axis; the inner part is closer to the conical hula seal longitudinal axis than the outer part; the outer part is axially and radially displaced from the inner part, relative to the conical hula seal longitudinal axis.

In one embodiment, the outer part is split into a plurality of outer part sections, with one outer part section attached to each finger. In one embodiment, the inner part is arranged to be attached to a picture frame surface, and the outer part is arranged to slidably contact the picture frame surface. This can provide for easier assembly. In one embodiment, the plurality of fingers are arranged in two overlapping layers. This can improve the seal.

According to a further aspect of the invention, there is provided a gas turbine comprising the conical hula seal described above. The conical hula seal can seal a gap with significant relative movements of the parts on either side of the gap.

In one embodiment, the gas turbine comprises a first vane and a picture frame and wherein the conical hula seal seals a gap between the first vane and the picture frame. This can provide leakage reduction at the interface between the picture frame (combustor outlet) and the first vane (rocking vane). The noble parts (first vane and picture frame) are not affected, and the solution can be retrofitted to existing turbines. This can also provide a sealing solution that is easy to assemble. The conical hula seal can also allow sealing of the gap between the first vane and the bulkhead/picture frame at all operating points despite the large range of movement at this location, due to its spring behaviour and high sliding capabilities.

In one embodiment, the conical hula seal is angled at an angle A from the conical hula seal longitudinal axis based on a determination of the relative movement of the first vane and the picture frame such that an elastic range of movement of the first vane relative to the picture frame is minimised. Angling the seal allows the gap width to be minimised, and the flexibility of the angle of the conical hula seal during the design phase allows for optimisation by minimising the gap width.

In one embodiment, the first vane comprises a contact surface to contact the conical hula seal, and the contact surface is conical or spherical. This can provide a suitable surface for the conical hula seal to contact.

In one embodiment, the conical hula seal is a conical hula seal segment and the gas turbine comprises a plurality of conical hula seal segments. Conical hula seal segments can make gas turbine assembly and maintenance easier.

In one embodiment, the gas turbine comprises a second seal in between the picture frame and the first vane and in series with the conical hula seal. In one embodiment, the second seal is a piston seal, an annular hula seal, a conical hula seal, a dogbone seal or a honeycomb seal. This can further improve the sealing of the gap, and can also provide a backup seal in case one of the seals fails.

According to a yet further aspect of the invention, there is provided a method of operating a gas turbine comprising a conical hula seal that seals a gap between a first vane and a picture frame, the method comprising the step of purging the gap with a cooling fluid. Purging the gap with a cooling fluid can reduce or stop hot gas ingestion into the gap and can ensure that hot gas does not pass the seal.

BRIEF DESCRIPTION OF THE DRAWINGS

An embodiment of the invention will now be described by way of example only and with reference to the accompanying drawings in which:

FIG. 1 shows a perspective view of a conical hula seal attached to a bulkhead;

FIG. 2 shows a top view of the conical hula seal of FIG. 1;

FIG. 3 shows a cross-section of the conical hula seal of FIGS. 1 and 2 along the line III-III of FIG. 2;

FIG. 4 shows graphically the movement of a point on the first vane surface during gas turbine operation;

FIGS. 5, 6 and 7 show the cross-section of FIG. 3 during different points in gas turbine operation; and FIG. 8 shows a cross-section of an embodiment of the invention comprising a honeycomb seal and a conical hula seal.

DETAILED DESCRIPTION OF THE PREFERRED EMBODIMENTS

The hula seals described herein can be described as conical hula seals. In annular hula seals, the hula seal describes a ring in which the inner part and the outer part are at the same distance from the central axis of the hula seal (i.e. the axis through the centre of the hula seal, which is the conical hula seal longitudinal axis in the longitudinal axis direction 30). In contrast, a conical hula seal has an inner part that is closer to the central axis of the hula seal than the outer part. In other words, the hula seal direction in an annular hula seal is parallel to the longitudinal axis direction 30 (conical hula seal longitudinal axis), whereas the hula seal direction in a conical hula seal is at an angle from the longitudinal axis direction.

A cone is a three-dimensional geometric shape that tapers smoothly from a flat base; the base may be circular or may be another shape. Mathematically, a conical hula seal is conical frustum, being in the shape of the surface of the frustum of a cone (i.e. a section of the cone not including the apex, also known as a truncated cone), in contrast to an annular hula seal in which the hula seal follows the shape of the surface of a cylinder. It should be noted for completeness that hula seals do not strictly describe a precisely annular or conical shape, as can be seen in FIG. 3 for example, where a conical hula seal 25 follows a hula seal direction 36 but the curvature of the fingers deviates slightly from a perfect cone.

Turning now to the embodiments shown in the Figures, FIG. 1 shows a conical hula seal 25 attached to a bulkhead 24, which is in turn attached to or part of a picture frame 23 (see FIG. 3). The conical hula seal 25 comprises an inner part 32 extending in a circumferential direction 40 (see FIG. 2) relative to a longitudinal axis direction 30 (or hula seal axis direction, see FIG. 3). The inner part 32 is configured to be attached to the surface 26 (see FIG. 3) of the bulkhead 24. A plurality of fingers 34, each attached to the inner part 32, extend away from the inner part 32 in a hula seal direction 36 (see FIG. 3). An outer part 38 (in this case outer part sections) is provided at the distal end of the fingers 34 from the inner part 32. The conical hula seal extends in a hula seal direction 36 (see FIG. 3) at an angle A from the longitudinal axis direction 30. The outer part 38 has a larger diameter (i.e. extends further in the circumferential direction) than the inner part 32.

The fingers 34 do not extend in a straight line, but curve such that the direction of each finger describes an angle greater than angle A nearer the inner part 32 and an angle smaller than angle A near the outer part 38. The outer part 38 is arranged to slidably contact the surface 27 (see FIG. 3) of the bulkhead 24.

FIG. 2 shows a top view of the conical hula seal of FIG. 1. From this view it can be seen that the conical hula seal extends in a circumferential direction 40.

FIG. 3 shows a cross-section of the conical hula seal of FIGS. 1 and 2 along the line III-III of FIG. 2, and also shows greater context in terms of the position of the conical hula seal in the gas turbine. There is a gap 39, 41, which can vary in size during gas turbine operation, between the first vane 21 (rocking vane) and the picture frame 23 of the gas turbine. The first vane 21 comprises a vane tooth 22 with an angled contact surface 29. As with the conical hula seal, the contact surface 29 is conical.

A gas turbine has a number of picture frames (sequential liner outlets) arranged around the circumference of the gas turbine. The hula seal can help seal the interface on the inner platform (inner diameter) between the picture frames and the first vane (rocking vane), in order to help reduce leakage to a minimum.

Rocking vane movements remain within an angled rectangular box 48 (see FIG. 4), and a hula seal according to the invention can help seal this interface despite the movements. FIG. 4 and the angled rectangular box 48 are described in more detail below.

The picture frame may be segmented and, for ease of maintenance, each picture frame or picture frame segment (sequential liner exit segment) around the circumference of the gas turbine in the circumferential direction 40 preferably has at least one conical hula seal on the inner diameter (inner platform), as this can help enable single vane/blade assembly/disassembly.

An angled contact surface 29 on the vane tooth 22 of the first vane 21 provides a surface for the conical hula seal 25 (specifically the fingers 34 of the conical hula seal 25) to contact. On the other side of the conical hula seal 25, the bulkhead 24 is attached to the picture frame 23, and the bulkhead has a surface 26, 27 which is preferably parallel to the surface 29 of the vane tooth 22. Small angular deviations from parallel can be accommodated, and during operation angular variations and therefore deviations from parallel will also occur due to movement of the first vane 21 (see FIG. 4). Movements of the first vane 21 are related to the rotation point of the first vane 21, the behaviour of the axial vane support (not shown) and the thermal behaviour of the components; these movements are described in greater detail below. The length of the surface 29 of the vane tooth and the surface 26, 27 of the bulkhead may be varied during design based on the movement of the first vane 21, the behaviour of the vane 21 as shown in the graph in FIG. 4, the thermal behaviour of the components and the length of the conical hula seal 25.

The conical hula seal 25 is attached (e.g. spot welded) on or near one end of the bulkhead surface 26 (the inner end of the bulkhead surface, relative to the gas turbine longitudinal axis) and is free to move relative to the bulkhead surface 27 (the outer end of the bulkhead surface, relative to the gas turbine longitudinal axis) at the other end of the conical hula seal 25. This allows the conical hula seal 25 to be compressed by vane surface 29; when the conical hula seal is compressed (i.e. when the gap between the vane surface 29 and the bulkhead surface 26, 27 is reduced) or relaxed (i.e. when the gap between the vane surface 29 and the bulkhead surface 26, 27 is increased), the unattached point on the conical hula seal (adjacent to point 27 on the bulkhead surface) moves relative to the bulkhead surface 27. When the conical hula seal is compressed, the distance between the inner part 32 and the outer part 38 increases, and when the conical hula seal is relaxed, the distance between the inner part 32 and the outer part 38 decreases.

During manufacture, the conical hula seal or seals can initially be attached to the bulkhead 24 (e.g. by a welding method such as spot welding). The bulkhead 24 can then be attached to the picture frame 23. The bulkhead can be mounted by bolting from the other side of the picture frame from the conical hula seal, i.e. the side of the picture frame distal from the bulkhead in the longitudinal axis direction 30. Pins or a groove could be used to centre the bulkhead on the picture frame. The bulkhead could be welded to the picture frame.

When in use, the first vane surface 29 (more specifically, a particular spot on the first vane surface 29) will move along a path similar to that shown in FIG. 4 during its operation cycle, relative to the picture frame 23. The range of movement fits within an angled rectangular box 48, angled at an angle $\alpha$ from the longitudinal axis direction 30. Preferably, angle A (see FIG. 3) is the same or substantially the same as angle $\alpha$. There are two directions of movement, the sliding range 58 and the elastic range 59. Movement can be due to various influences, including rocking (rotation) of the first vane (particularly in the direction of sliding range 58) and due to thermal expansion/contraction of components (particularly in the direction of elastic range 59).

Initially, at the assembly or cold position 50 in FIG. 4, the first vane 21 is in the position shown in FIG. 5. During startup, the first vane starts moving in a direction as shown by movement line 56, passing through point 51 which may be a first maximum extent in the sliding range. FIG. 6 shows the first vane position at point 51. At full load, the first vane position may be at point 52, and during steady state operation the first vane position may be at point 53. During operation, the loading may vary, and the first vane position may vary accordingly, moving on or near the movement line 56 in the area between and around points 52 and 53. On shut down, the first vane then cools and continues further around the movement line 56. During shut down, the first vane reaches a second maximum extent on the sliding range at point 54. FIG. 7 shows the first vane position at point 54. Once fully cooled, the first vane will have completed a full circle of movement line 56, arriving back at its cold position at point 50.

The movement line 56 of FIG. 4 and the description of the points on the curve are an approximation, and deviations may occur from this approximation.

FIG. 8 shows a first vane 21 (rocking vane) on one side of a gap to be sealed, with a vane tooth 22 and an additional sealing portion 64. On the other side of the gap to be sealed is a picture frame 23 and a bulkhead 24 attached to the picture frame 23. In the gap between the first vane 21 and the picture frame 23 and bulkhead 24, a first seal (conical hula seal 25) and a second seal (honeycomb seal 66) are arranged.

In a gas turbine, a plurality of picture frames (sequential liner outlets) are arranged around the longitudinal axis of the gas turbine in a ring, with the picture frames typically being attached to sequential liners and the sequential liners typically surrounding can combustors. The longitudinal axis of the gas turbine is generally parallel to the conical hula seal longitudinal axis direction 30. In other words, the picture frames all intersect a plane perpendicular to the longitudinal axis. The sealing solution discussed in this application can be applied on the inner diameter of the picture frames (the edge of the picture frames closest to the longitudinal axis). This can allow for single vane/blade assembly and/or disassembly during manufacture, maintenance and repair.

In a method of operating a gas turbine as described herein, the gap may be purged with a cooling fluid such as air. The cooling fluid would generally be fed into the gap 41 at the end distal to the hot gas flow.

The bulkhead 24 is shown as a separate part attached to the picture frame in the embodiments described herein, but may also be an integral part of the picture frame, in which case the bulkhead surface would be equivalent to the picture frame surface, for example. The shape of the bulkhead and/or the picture frame could vary depending on the shape of the picture frame and the desired location of the conical hula seal. Similarly, the first vane 21 may vary in shape depending on the shape of the picture frame, the conical hula seal and/or the bulkhead.

The conical hula seals described herein are for a gas turbine, preferably for sealing a gap between two static parts such as the gap between the picture frame and the first vane. The conical hula seals described herein are placed between the picture frame and the first vane, but may also be used in other locations in the gas turbine. Although the seal may entirely stop the flow of hot gas through the gap, it is not necessary to completely seal the gap, and a flow of a cooling fluid such as air through the seal may be beneficial in terms of purging hot gas, for example purging gas from the gap 39 between the picture frame 23 and the first vane 21 in FIG. 3 that extends from the conical hula seal 25 to the hot gas path. To this end, a purging flow of cooling fluid may be provided at the end of the gap 41.

The conical hula seal may be attached to the bulkhead by either the inner part or the outer part, as no pressure activation is needed, in contrast to a dogbone seal, for example.

The conical hula seal may be made of various materials, for example a nickel-based alloy such as Waspaloy®. This can allow the hula seal to withstand the high temperatures and pressures of the first vane-picture frame region of the gas turbine.

The conical hula seal may be an entire ring or may be made up of multiple individual conical hula seals (conical hula seal segments). The conical hula seal of FIG. 1 is a conical hula seal segment. In one example, 20 conical hula seals are placed around the 360° annular joint, each extending 15° around the circumference in the circumferential direction 40.

The conical hula seal 25 describes a partial or full ring as described above. The conical hula seal longitudinal axis direction 30 will typically be the direction perpendicular to the plane of this partial or full ring; in other words, the longitudinal axis direction is typically the direction of the axis through the central point of the conical hula seal described by the longitudinal axis of a conical hula seal. For conical hula seal segments, the longitudinal axis of each conical hula seal segment is the longitudinal axis of a full ring of conical hula seal segments. The conical hula seal longitudinal axis will generally also be the longitudinal axis of the picture frame at the end of the sequential liner (the combustor outlet).

The conical hula seal shown in the examples above is circular (e.g. FIGS. 1 and 2), i.e. the distance from the inner part 32 (and from the outer part 38) to the conical hula seal longitudinal axis is constant for the entire conical hula seal. Small deviations from a circular shape are possible. In some embodiments, the conical hula seal may be used in combination with a second seal, with one example shown in FIG. 8. The second seal could be a second conical hula seal, a piston seal, a dogbone seal, a honeycomb seal or another type of hula seal. The second seal would be in series with the conical hula seal; that is, the second seal would be in a different part of the gap to the conical hula seal in the axial direction perpendicular to the longitudinal axis direction 30. In other words, any escaping gas from the hot gas flow would have to pass through both the conical hula seal and the second seal.

The contact surface 29 of the vane tooth 22 is described above as conical (i.e. conical frustum), but the contact surface 29 could also be spherical (i.e. the shape of a surface of a spherical segment or a spherical frustum), with either a concave surface or a convex surface. The bulkhead surface 26, 27 is also shown as having a conical surface in the Figures, but other shapes may be used such as a spherical surface, and the bulkhead surface 26, 27 may be changed to match or to parallel the shape of the contact surface 29 of the vane tooth 22. The vane tooth may be an integral part of the first vane as described above, or may be a separate component attached to the first vane. The vane may have a second vane tooth for the outer platform, in which case the vane tooth described herein would be the vane inner tooth, for the inner platform.

During design of the vane tooth 22, the extent of the vane tooth and particularly the vane tooth surface 29 may be decided based on the extent of movement of the first vane as shown in FIG. 4. The vane tooth preferably extends at least as far as the maximum extent of movement of the first vane, and more preferably further. This can allow the vane tooth to contact the conical hula seal under all operating conditions. Similarly, the extent of the bulkhead surface 27 can be designed based on the extent of movement required of the outer part 38 of the conical hula seal relative to the bulkhead surface (or the inner part, in embodiments where the inner part is moveable relative to the bulkhead surface).

In the Figures, the inner part 32 is shown attached to the bulkhead and the outer part 38 is in contact and free to move slidably on the surface 27 of the bulkhead, but in some embodiments the outer part may be attached to the bulkhead and the inner part is free to move slidably on the surface 27 of the bulkhead.

The fingers 34 are described above as having a particular curvature, with an angle greater than angle A nearer the inner part 32 and an angle smaller than angle A near the outer part 38. Other curvatures are possible; the main requirement is that the fingers are capable of acting as a spring. That is, they can straighten when the first vane and bulkhead move closer together, and then bend back out when the first vane and bulkhead move further apart. The curvature may be continuous (as in the fingers described herein) or discontinuous.

In FIGS. 1 and 2, a single set of fingers 34 can be seen. In some embodiments, the conical hula seal comprises a second set of fingers. This second set of fingers is adjacent to the first set of fingers in a direction perpendicular to the hula seal direction, so that the fingers form two overlapping layers. Preferably, the second set of fingers is offset in the circumferential direction compared to the first set of fingers; that is, the gap between any given pair of fingers in the first set of fingers is offset from the nearest gap between any given pair of fingers in the second set of fingers, preferably such that the two gaps do not overlap in the circumferential direction. To provide embodiments with two overlapping layers, two single-layer hula seals may be attached to one another.

The hula seal direction 36 is preferably set during design of the gas turbine such that angle A is within 15° of angle α, more preferably within 5°, and most preferably at an angle A=α. This is the angle that minimises the relative movement of the first vane and the picture frame/bulkhead during gas turbine operation. This minimises the elastic range 59 and thus enables the gap between the first vane and the picture frame/bulkhead, specifically between the vane tooth surface 29 and the bulkhead surface 26, 27, to be minimised. This minimises the required range of movement of the conical hula seal. Similarly, the bulkhead surface 26, 27 associated with the conical hula seal is preferably at an angle within 15° of angle α, more preferably within 5°, and most preferably at an angle A=α, and the vane tooth surface is preferably within 15° of angle α, more preferably within 5°, and most preferably at an angle A=α.

The conical hula seal may be made as an integral component, or the inner part, fingers and outer part may be separate components joined together.

The gap 39 proximate the hot gas flow may be various shapes, depending on the shape of the first vane and the picture frame/bulkhead.

The gap 39, 41 is basically a volume extending between the picture frame/bulkhead and the first vane. At one end of the gap 39, the gap opens out into the hot gas flow, and at the other end of the gap 41, the gap opens out into the compressor plenum.

The gap 39, 41 (see FIG. 3) may be purged. In this case, the pressure in the gap 39 at the hot gas end is lower than the pressure at the other end of the gap 41 (at the other side of the conical hula seal). As a result, cooling fluid can leak through the seal.

Various modifications to the embodiments described are possible and will occur to those skilled in the art without departing from the invention which is defined by the following claims.

REFERENCE SIGNS 21 first vane (rocking vane)
22 vane tooth (vane inner tooth)
23 picture frame (sequential liner exit/outlet)
24 bulkhead
25 conical hula seal
26 bulkhead surface (inner bulkhead surface)
27 bulkhead surface (outer bulkhead surface)
29 vane tooth surface (angled contact surface)
30 (conical hula seal) longitudinal axis direction
32 inner part
34 finger
36 hula seal direction
38 outer part
39 gap
40 circumferential direction
41 gap
48 angled rectangular box
50 assembly/cold position
51 startup
52 full load
53 steady state operation
54 extreme point in shut down
56 movement line
58 sliding range
59 elastic range
64 additional sealing portion
66 honeycomb seal
A angle
α angle

The invention claimed is:

1. A conical hula seal comprising:
an inner part;
an outer part, wherein
the inner part of the conical hula seal is closer to a conical hula seal longitudinal axis than the outer part of the conical hula seal, and wherein the conical hula seal extends in a circumferential direction relative to the conical hula seal longitudinal axis; and
a plurality of fingers, wherein the inner part is attached to one end of each of the plurality of fingers and the outer part is attached to the other end of each of the plurality of fingers, and the inner part is arranged to be attached to a bulkhead, and the outer part is arranged to slidably contact the bulkhead, the portion of the hula seal from the inner part to the outer part is arc-shaped in cross-section.

2. The conical hula seal of claim 1, wherein:
the inner part and the outer part each extend in a circumferential direction relative to the conical hula seal longitudinal axis;
and
the outer part is axially and radially displaced from the inner part, relative to the conical hula seal longitudinal axis.

3. The conical hula seal of claim 1, wherein the outer part is split into a plurality of outer part sections, with one outer part section attached to each finger.

4. The conical hula seal of claim 1, wherein the plurality of fingers are arranged in two overlapping layers.

5. A gas turbine comprising:
   the conical hula seal of claim 1.

6. The gas turbine of claim 5, comprising:
   a first vane and a picture frame and wherein the conical hula seal seals a gap between the first vane and the picture frame.

7. The gas turbine of claim 6, in which the conical hula seal is angled at an angle A from the conical hula seal longitudinal axis based on a determination of the relative movement of the first vane and the picture frame, such that an elastic range of movement of the first vane relative to the picture frame is minimised.

8. The gas turbine of claim 7, in which the first vane comprises:
   a contact surface to contact the conical hula seal, and the contact surface is conical or spherical.

9. The gas turbine of claim 5, in which the conical hula seal is a conical hula seal segment and the gas turbine comprises:
   a plurality of conical hula seal segments.

10. The gas turbine of claim 5, comprising:
    a second seal in between a picture frame and a first vane and in series with the conical hula seal.

11. The gas turbine of claim 10, in which the second seal is a piston seal, an annular hula seal, a conical hula seal, a dogbone seal or a honeycomb seal.

12. A method of operating a gas turbine having a conical hula seal that seals a gap between a first vane and a picture frame, the hula seal including an inner part; an outer part, wherein the inner part of the conical hula seal is closer to a conical hula seal longitudinal axis than the outer part of the conical hula seal, and wherein the conical hula seal extends in a circumferential direction relative to the conical hula seal longitudinal axis; and a plurality of fingers, wherein the inner part is attached to one end of each of the plurality of fingers and the outer part is attached to the other end of each of the plurality of fingers, and the inner part is arranged to be attached to a bulkhead, and the outer part is arranged to slidably contact the bulkhead the method comprising:
    purging the gap with a cooling fluid.

13. A gas turbine comprising:
    a conical hula seal, including an inner part, an outer part, wherein the inner part of the conical hula seal is closer to a conical hula seal longitudinal axis than the outer part of the conical hula seal, and wherein the conical hula seal extends in a circumferential direction relative to the conical hula seal longitudinal axis, and a plurality of fingers, wherein the inner part is attached to one end of each of the plurality of fingers and the outer part is attached to the other end of each of the plurality of fingers, and the inner part is arranged to be attached to a bulkhead, and the outer part is arranged to slidably contact the bulkhead; and
    a first vane and a picture frame and wherein the conical hula seal seals a gap between the first vane and the picture frame.

14. The gas turbine of claim 13, wherein the conical hula seal is angled at an angle A from the conical hula seal longitudinal axis based on a determination of the relative movement of the first vane and the picture frame, such that an elastic range of movement of the first vane relative to the picture frame is minimised.

15. The gas turbine of claim 14, wherein the first vane comprises:
    a contact surface to contact the conical hula seal, and the contact surface is conical or spherical.

16. The gas turbine of claim 13, wherein the conical hula seal is a conical hula seal segment and the gas turbine comprises:
    a plurality of conical hula seal segments.

17. The gas turbine of claim 13, comprising:
    a second seal in between a picture frame and a first vane and in series with the conical hula seal.

18. The gas turbine of claim 17, wherein the second seal is a piston seal, an annular hula seal, a conical hula seal, a dogbone seal or a honeycomb seal.

* * * * *